Feb. 21, 1928.

J. H. MAYHEW 1,659,695

ASPIRATOR

Filed Sept. 16, 1926     3 Sheets-Sheet 1

Inventor
Joseph H. Mayhew
By his Attorneys

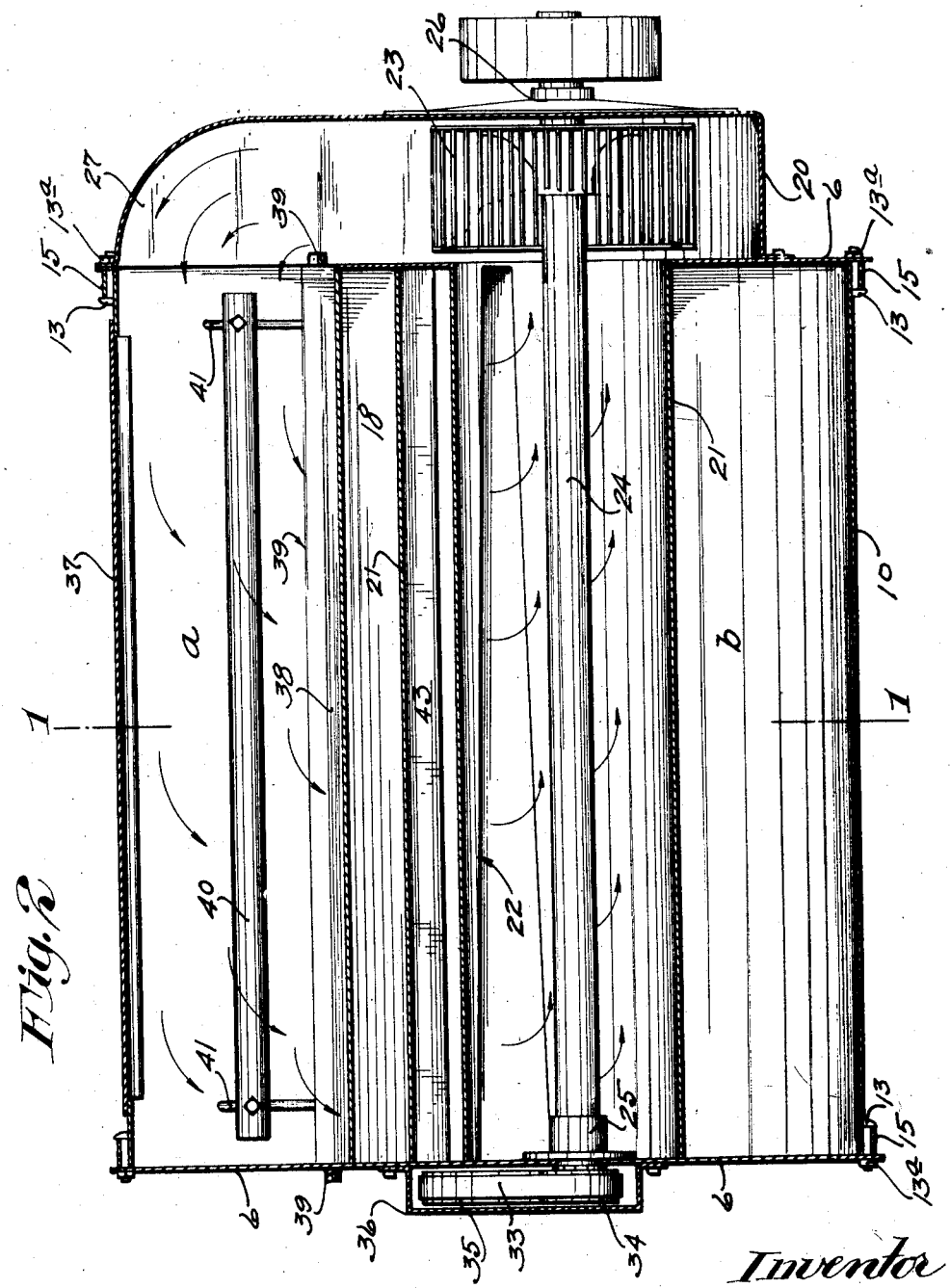

Feb. 21, 1928.
J. H. MAYHEW
ASPIRATOR
Filed Sept. 16, 1926   3 Sheets-Sheet 3
1,659,695
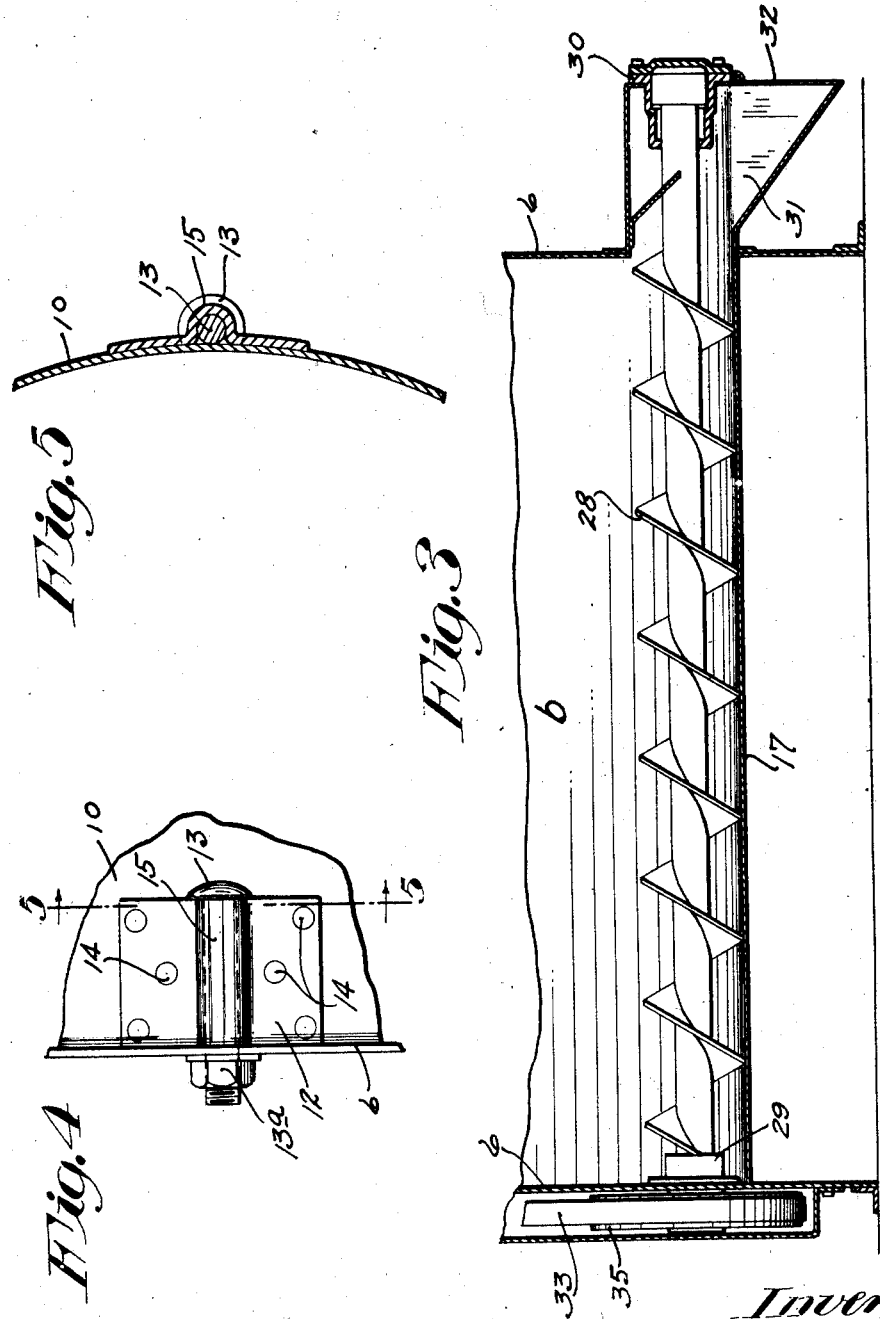
Inventor
Joseph H. Mayhew
By his Attorneys Patented Feb. 21, 1928.

1,659,695

UNITED STATES PATENT OFFICE.

JOSEPH H. MAYHEW, OF MINNEAPOLIS, MINNESOTA, ASSIGNOR TO CARTER-MAYHEW MANUFACTURING COMPANY, OF MINNEAPOLIS, MINNESOTA, A CORPORATION OF MINNESOTA.

ASPIRATOR.

Application filed September 16, 1926. Serial No. 135,818.

My invention provides a simple and highly efficient aspirator especially adapted for use in mills, elevators and the like for removing dust from wheat or other cereals and, generally stated, consists of the novel devices, combinations of devices and arrangement of parts hereinafter described and defined in the claims.

The accompanying drawings illustrate a commercial form of the aspirator designed especially for use as a grain cleaner and dust collector, and in which the air used in the cleaning action is circulated over and over and passed in a continuous stream through the grain delivered to the apparatus.

Referring to the drawings wherein like characters indicate like parts throughout the several views, Fig. 1 is a vertical section taken through the complete aspirator or apparatus on the line 1—1 of Fig. 2;

Fig. 2 is a horizontal section taken on the irregular line 2—2 of Fig. 1;

Fig. 3 is a fragmenetary vertical section on the line 3—3 of Fig. 1;

Fig. 4 is a detail illustrating one of the couplings for connecting the sides and transverse plates of the main casing; and Fig. 5 is a section on the line 5—5 of Fig. 4.

Figure 1:
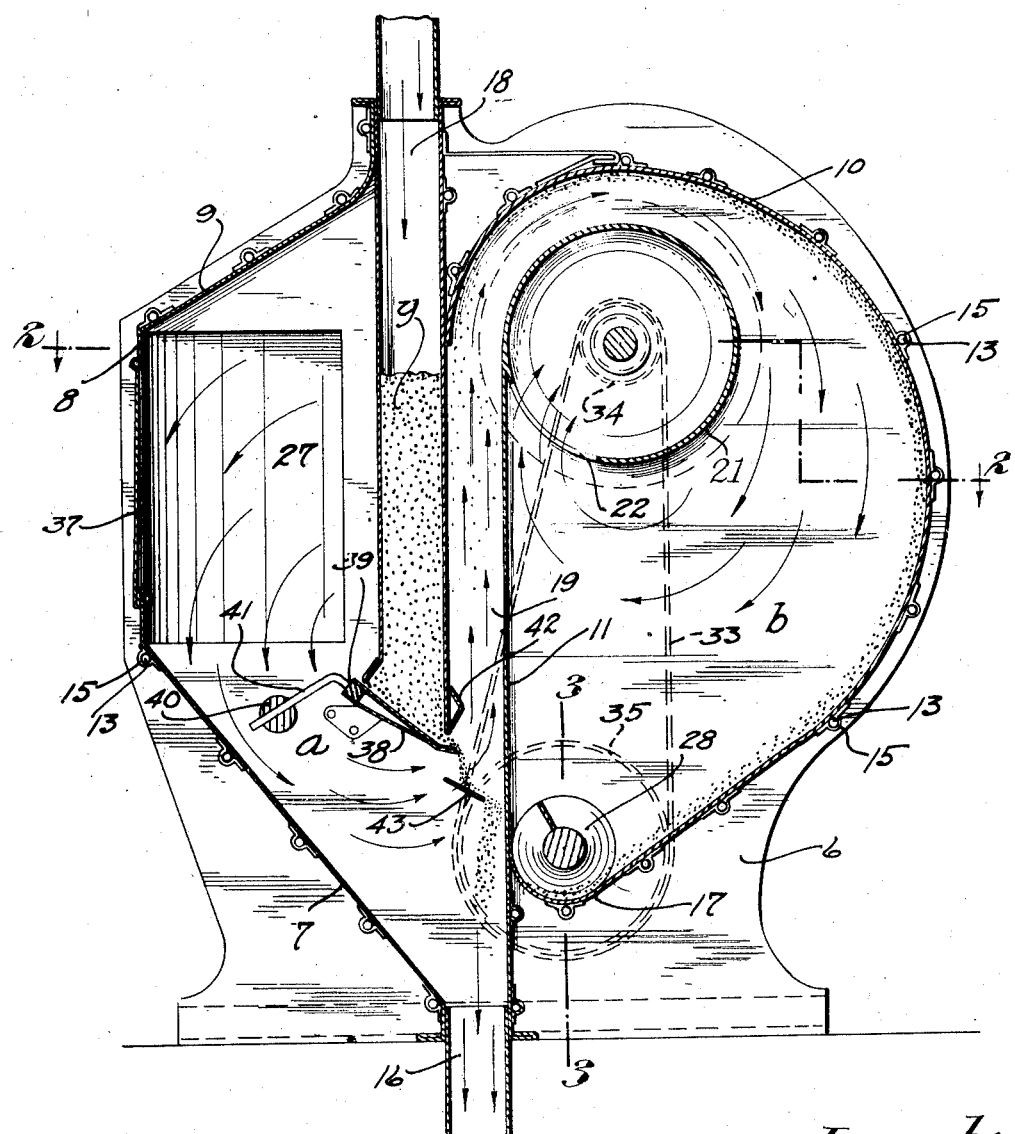

The main shell or casing of the apparatus is made up of parallel laterally spaced upright side plates 6 and transverse plates 7, 8, 9, 10 and 11. As a simple means for connecting the edges of the plates 7 to 11, inclusive, to the side plates 6 I preferably use couplings best shown in detail in Figs. 4 and 5, and which couplings comprise metal clips 12 and co-operating nut-equipped bolts 13. The clips 12 are secured to the respective plates 7 to 11 by spot welding at 14, and they are formed with outwardly pressed channels 15 that afford passages for the bolts 13. The bolts 13 are passed through said channels and through perforations in the side plates 6 and when the nuts 13ª applied to the outer ends of the bolts are then tightened the edges of the plates 7 to 11 will be tightly drawn against the side plates and the whole shell structure will be very rigidly but detachably connected.

The plate 11 divides the interior of the main casing into two compartments, to wit: a clean air chamber $a$ and a dust precipitating chamber $b$, the former of which is extended downward and joined to a grain discharge spout 16, and the latter of which is extended downward to form a dust-receiving pocket 17. A feed spout 18 extends downward through the top of the casing and terminates above the bottom of the chamber $a$. This feed spout 18 is spaced from the partition plate 11 so as to afford an upwardly extended dust-receiving suction tube 19. Located at one side of the main casing and secured to one of the side plates 6 is a fan casing 20 that is provided with an axial air intake tube 21. The feed spout 18, the discharge spout 16, the suction tube 19 and the air intake tube 21 are all extended transversely of the casing from the one side plate 6 to the other. The axial air intake tube 21 is formed with a long air intake port 22 that extends preferably from the one side plate 6 to the other and has increasing width in a direction away from the fan casing so that it will tend to cause an equal draft through the length of said air intake tube.

Working within the fan casing 20 is a centrifugal fan or fan head 23 of the usual or any suitable construction. This fan head is secured to a long transverse shaft 24 shown as journaled in a bearing 25 on one of the side plates 6 and in a bearing 26 on the outer plate of the fan casing 20. The fan casing 20 is provided with a large air discharge tube 27 that opens through the adjacent side plate 6 in one side of the clean air chamber $a$.

Working in the transverse dust pocket 17 is a spiral conveyor 28 the shaft of which is journaled in a bearing 29 on one of the side plates 6 and in a bearing 30 applied to a discharge spout 31 applied to the other plate 6. This discharge spout 31 is provided with a gravity closed gate 32 that will be freely opened under the pressure of the accumulated dust. The conveyor 28, as shown, is driven through a belt 33 that runs over a pulley 34 on one end of the fan shaft 24 and over a pulley 35 on the corresponding end of the conveyor shaft. As shown, the belt 33 and pulleys 34 and 35 are enclosed by a guard plate 36 applied to the adjacent side plate 6.

The plate 8 is shown as provided with a gravity-closed gate 37 which is opened for access to the clean air chamber $a$.

The lower or delivery end of the feed spout 18 has a yieldingly closed gate that holds back the grain or stock $y$ and causes the same to accumulate and fill said spout and also functions as a deflector to cause the grain or stock to be cleaned to be projected through a stream of air that is being drawn or forced upward into the receiving end of the suction spout 9. This gate 38 is secured to a shaft 39, the trunnion-like ends of which are journaled in suitable bearings on the side plates 6. As a yielding means for tending to hold the gate 38 closed, I preferably employ a weight. This weight, as shown, is in the form of a metal bar 40 adjustably secured on parallel arms 41 that are rigidly secured to the shaft 39. By adjustment of the weight 40 on the arms 41 the thickness of the stream of grain that will be discharged from the feed spout through the current of air may be varied.

By reference to Fig. 1 it will be noted that the plate 10 is curved in such manner that it joins with or against the adjacent wall of the feed spout 18 and forms an upward extension of the suction spout 19 that passes over the air intake tube 21. Also it will be noted that the plate 10 progressively increases its distance from the tube 21 in a downward direction toward the dust pocket or trough 17. Otherwise stated, the dust pocket 17 lies far below the air tube 21 so that as the dust-laden air is drawn into the dust chamber b it will be expanded and its velocity decreased in such manner that a substantially dead air chamber will be formed in the bottom of said chamber. To increase the velocity of the air just above the place where it is drawn through the sheet of grain discharged from the feed spout 18, the cross section of said suction tube 19 is decreased by a bulge or rib 42 shown as applied to the adjacent wall of the feed spout 18, as best shown in Fig. 1.

Located below the delivery edge of the gate 38 is an oblique deflecting plate 43 that extends completely across the clean air chamber a and is spaced from the plate 11. The purpose and function of this plate will be particularly noted in the description of the operation.

The operation of the aspirator is substantially as follows:

When the fan is in action, a strong forced current of air will be produced in the direction of the arrows marked on Figs. 1 and 2. The blast of air produced will be forced from the fan casing into the clean air chamber a and a suction or partial vacuum will be produced in the dust chamber b, thereby producing a suction as well as an upward pressure of air through the suction spout 19. This draft of air will not be strong enough to pick up good grain but it will be stong enough to pick up dust, chaff, and other like foreign particles. Here it may be stated that the term "dust" is herein sometimes used in a broad sense to include all of the like foreign particles capable of being separated from the good grain by the action of air current.

The grain released from the feed spout 18 from the lower edge of the gate 38 will drop onto the deflecting plate 43 and by the latter will be intercepted and deflected toward the plate 11. By this arrangement the grain is caused to be twice subjected to the upwardly moving air blast, to wit: first, it is subjected to air passing upward between the lower edge of the gate 38 and the upper edge of the deflecting plate 43, and second, it will be subjected to air passing upward between the lower edge of the deflecting plate 43 and adjacent plate 11. This insures the best kind of cleaning in that it gives air two chances to pick up the dust and to carry the same out of the flowing sheet-like stream of grain discharged from the feed spout 18. The cleaned grain will, of course, pass downward and outward through the spout 16.

As the dust-laden air is delivered into the dust chamber b the dust will, partly by the action of gravity but largely by the action of centrifugal force, be thrown against the eccentric plate 10 and delivered into the dust pocket or trough 17 while the clean air will take a shorter course and be drawn into the air tube 21 through the port 22 and then back to the fan, from which fan the clean air will be again delivered into the clean air chamber a. The air is thus continuously circulated through the apparatus and used over and over again in the cleaning operation. The separation of the dust from the air is accomplished chiefly by the cyclonic or centrifugal action but is assisted by the action of gravity. The aspirator is a complete self-contained apparatus in which the dust collection is made within the casing in which the separation of the dust from the grain is produced.

In the use of the aspirator at mills, the grain will usually come to the aspirator with a moisture content proper for milling and in the separation of the dust by the use of this apparatus, said moisture content will not be perceptibly changed for the reason that the air being used over and over again will acquire substantially the same moisture content as the grain and will neither dry out the grain nor add moisture thereto.

What I claim is:

1. In an aspirator, a main casing forming a dust chamber and a clean air chamber, a feed spout extended downward into said casing between said chambers, a fan casing located at one side of said main casing and having an axial air intake tube extended transversely within said dust chamber and formed with an air intake port opening from said dust chamber, a fan head working within said fan casing, said fan casing having an air discharge duct opening into said clean air chamber, and a dust-receiving suction tube extended adjacent the delivery end of said feed spout and around said axial air intake tube and delivering into said dust chamber.

2. In an aspirator, a main casing forming a dust chamber and a clean air chamber, a feed spout extended downward into said casing between said chambers, a fan casing located at one side of said main casing and having an axial air intake tube extended transversely within said dust chamber and formed with an air intake port opening from said dust chamber, a fan head working within said fan casing, said fan casing having an air discharge duct opening into said clean air chamber, and a dust-receiving suction tube extended adjacent the delivery end of said feed spout and around said axial air intake tube and delivering into said dust chamber, said main casing having parallel sides and said feed spout, axial air intake tube and suction tube being extended substantially from side to side of said main casing.

3. The structure defined in claim 1 in further combination with a yieldingly closed pressure opened gate at the delivery end of said feed spout acting as a deflector for projecting the stock to be cleaned transversely of the receiving portion of said suction tube.

4. The structure defined in claim 1 in further combination with a yieldingly closed pressure opened gate at the delivery end of said feed spout acting as a deflector for projecting the stock to be cleaned transversely of the receiving portion of said suction tube, and means for varying the tension at which said gate will be set to close.

5. The structure defined in claim 1 in which that portion of said main casing that forms the dust chamber has progressively increasing distance from said axial air intake tube in a direction from the top toward the bottom of said dust chamber, thereby forming a dust-collecting pocket at the bottom of said dust chamber.

6. The structure defined in claim 1 in which that portion of said main casing that forms the dust chamber has progressively increasing distance from said axial air intake tube in a direction from the top toward the bottom of said dust chamber, thereby forming a dust-collecting pocket at the bottom of said dust chamber, and a conveyor working in the dust pocket at the bottom of said dust chamber and serving to discharge the collected dust therefrom.

In testimony whereof I affix my signature.

JOSEPH H. MAYHEW.